United States Patent
Liu et al.

(10) Patent No.: US 12,105,744 B2
(45) Date of Patent: Oct. 1, 2024

(54) SYSTEMS AND METHODS FOR SEMANTIC PARSING WITH PRIMITIVE LEVEL ENUMERATION

(71) Applicant: Salesforce, Inc., San Francisco, CA (US)

(72) Inventors: Ye Liu, San Francisco, CA (US); Semih Yavuz, Redwood City, CA (US); Yingbo Zhou, Palo Alto, CA (US); Rui Meng, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/059,691

(22) Filed: Nov. 29, 2022

(65) Prior Publication Data
US 2024/0176805 A1   May 30, 2024

(51) Int. Cl.
| | |
|---|---|
| G06F 16/00 | (2019.01) |
| G06F 16/33 | (2019.01) |
| G06F 16/332 | (2019.01) |
| G06F 40/205 | (2020.01) |
| G06F 40/295 | (2020.01) |
| G06F 40/30 | (2020.01) |
| G06F 40/40 | (2020.01) |

(52) U.S. Cl.
CPC ...... *G06F 16/3329* (2019.01); *G06F 16/3344* (2019.01); *G06F 40/205* (2020.01); *G06F 40/295* (2020.01); *G06F 40/30* (2020.01); *G06F 40/40* (2020.01)

(58) Field of Classification Search
None
See application file for complete search history.

(56) References Cited

U.S. PATENT DOCUMENTS

| | | | | |
|---|---|---|---|---|
| 9,798,800 | B2* | 10/2017 | Duboue | G06F 16/334 |
| 11,188,530 | B2* | 11/2021 | Rumiantsau | G06F 16/252 |
| 11,520,815 | B1* | 12/2022 | Gutta | G06F 40/186 |
| 11,762,852 | B2* | 9/2023 | Rumiantsau | G06F 16/2445 |
| | | | | 707/760 |

(Continued)

FOREIGN PATENT DOCUMENTS

WO   2011053755 A1   5/2011

OTHER PUBLICATIONS

Jonathan Berant et al. Semantic parsing on freebase from question-answer pairs. In Proceedings of the 2013 conference on empirical methods in natural language processing, pp. 1533-1544.

(Continued)

*Primary Examiner* — Debbie M Le
(74) *Attorney, Agent, or Firm* — Haynes and Boone, LLP

(57) ABSTRACT

Embodiments described herein provide a semantic parsing framework which may be referred to as Uni-Parser. The Uni-Parser framework may be applied to question answering on both knowledge bases and databases. The three main stages of the Uni-Parser framework are enumeration, ranking, and generation. At the enumeration stage, primitives are enumerated based on matching the question to the data structure. After enumerating primitives, the Uni-Parser framework may rank the primitives used a trained ranker model. The top ranked primitives may then be used as inputs to a generator which is a learned sequence to sequence model which produces a logical form.

20 Claims, 17 Drawing Sheets

(56) References Cited

U.S. PATENT DOCUMENTS

| | | | |
|---|---|---|---|
| 2020/0257679 A1* | 8/2020 | Sheinin | G06N 3/08 |
| 2022/0083546 A1* | 3/2022 | Rumiantsau | G06F 16/2282 |
| 2022/0156251 A1 | 5/2022 | Kempf et al. | |

OTHER PUBLICATIONS

Jonathan Berant and Percy Liang. 2014. Semantic parsing via paraphrasing. In Proceedings of the 52nd Annual Meeting of the Association for Computational Linguistics (vol. 1: Long Papers), pp. 1415-1425.

Scott Wen-tau Yih, Ming-Wei Chang, Xiaodong He, and Jianfeng Gao. 2015. Semantic parsing via staged query graph generation: Question answering with knowledge base. In Proceedings of the Joint Conference of the 53rd Annual Meeting of the ACL and the 7th International Joint Conference on Natural Language Processing of the AFNLP.

Yawei Sun, Lingling Zhang, Gong Cheng, and Yuzhong Qu. 2020. SPARQA: skeleton-based semantic parsing for complex questions over knowledge bases. In Proceedings of the AAAI Conference on Artificial Intelligence, vol. 34, pp. 8952-8959.

Xi Ye, Semih Yavuz, Kazuma Hashimoto, Yingbo Zhou, and Caiming Xiong. 2021. Rng-kbqa: Generation augmented iterative ranking for knowledge base question answering. arXiv preprint arXiv:2109.08678.

Wei-Cheng Chang, Felix X Yu, Yin-Wen Chang, Yiming Yang, and Sanjiv Kumar. 2020. Pre-training tasks for embedding-based large-scale retrieval. arXiv preprint arXiv:2002.03932.

Yu Gu, Sue Kase, Michelle Vanni, Brian Sadler, Percy Liang, Xifeng Yan, and Yu Su. 2021. Beyond iid: three levels of generalization for question answering on knowledge bases. In Proceedings of the Web Conference 2021, pp. 3477-3488.

Shuang Chen, Qian Liu, Zhiwei Yu, Chin-Yew Lin, Jian-Guang Lou, and Feng Jiang. 2021. Retrack: a flexible and efficient framework for knowledge base question answering. In Proceedings of the 59th Annual Meeting of the Association for Computational Linguistics and the 11th International Joint Conference on Natural Language Processing: System Demonstrations, pp. 325-336.

Xi Victoria Lin, Richard Socher, and Caiming Xiong. 2020. Bridging textual and tabular data for cross-domain text-to-sql semantic parsing. arXiv preprint arXiv:2012.12627.

International Search Report and Written Opinion for PCT/US2023/026146, dated Sep. 21, 2023, 7 pages.

* cited by examiner

|  | Overall | | I.I.D | | Compositional | | Zero-Shot | |
| --- | --- | --- | --- | --- | --- | --- | --- | --- |
|  | EM | F1 | EM | F1 | EM | F1 | EM | F1 |
| Bert Ranking (Test) (Gu et al., 2021) | 50.6 | 58.0 | 59.9 | 67.0 | 45.5 | 53.9 | 48.6 | 55.7 |
| ReTrack (Test) (Chen et al., 2021) | 58.1 | 65.3 | 84.4 | 87.5 | 61.5 | 70.9 | 44.6 | 52.5 |
| UnifiedSKG (Test) (Xie et al., 2022) | 62.4 | - | - | - | - | - | - | - |
| RNG-KBQA (Test) (Ye et al., 2021) | 68.8 | 74.4 | 86.2 | 89.0 | 63.8 | 71.2 | 63.0 | 69.2 |
| UnifiedSKG (Dev) (Xie et al., 2022) | 60.0 | - | - | - | - | - | - | - |
| RNG-KBQA (Dev) | 70.7 | 75.7 | 86.4 | 88.6 | 61.7 | 68.3 | 67.4 | 73.1 |
| Uni-Parser (Dev) | 70.8 | 76.5 | 85.7 | 88.3 | 62.8 | 71.4 | 67.7 | 73.4 |

FIG. 11

|  | EM | F1 |
|---|---|---|
| Topic Units *(Lan et al., 2019)* | - | 67.9 |
| STAGG *(Yih et al., 2015)* | 63.9 | 71.7 |
| QGG *(Lan and Jiang, 2020)* | - | 74.0 |
| CBR *(Das et al., 2021)* | 70.0 | 72.8 |
| ReTrack *(Chen et al., 2021)* | - | 71.0 |
| RNG-KBQA *(Ye et al., 2021)* | 71.1 | 75.6 |
| ArcaneQA *(Gu and Su, 2022)* | - | 75.3 |
| Uni-Parser | 71.4 | 75.8 |

FIG. 12

|  | EM | F1 |
|---|---|---|
| Global-GNN *(Bogin et al., 2019)* | 52.7 | - |
| EditSQL *(Zhang et al., 2019b)* | 57.6 | - |
| T5-Base *(Scholak et al., 2021)* | 57.2 | 57.9 |
| UnifiedSKG(T5-Base) *(Xie et al., 2022)* | 58.1 | - |
| Uni-Parser (T5-Base) | 61.2 | 62.8 |
| RAT-SQL *(Wang et al., 2019)* | 69.7 | - |
| BRIDGE(Large) *(Lin et al., 2020)* | 70.0 | 68.0 |
| T5-3B* *(Scholak et al., 2021)* | 71.5 | 74.4 |
| UnifiedSKG(T5-3B) *(Xie et al., 2022)* | 71.7 | - |
| Uni-Parser(T5-3B) | 71.2 | 71.8 |

FIG. 13

|  | EM | F1 |
|---|---|---|
| SQLova *(Hwang et al., 2019)* | 80.7 | 86.2 |
| X-SQL *(He et al., 2019)* | 83.3 | 88.7 |
| IE-SQL *(Ma et al., 2020)* | 84.6 | 88.8 |
| NL2SQL *(Guo and Gao, 2019)* | 83.7 | 89.2 |
| HydraNet *(Lyu et al., 2020)* | 83.8 | 89.2 |
| BRIDGE(Large) *(Lin et al., 2020)* | 85.7 | 91.1 |
| TAPEX *(Liu et al., 2021)* | - | 89.5 |
| Uni-Parser(T5-Base) | 85.8 | 91.3 |
| Uni-Parser(T5-Large) | 86.9 | 92.1 |

FIG. 14

|              | w/o CG | w/o HN | w/ HN |
|---|---|---|---|
| KBQA: WebQSP | | | |
| Top - 1      | 54.5   | 56.2   | 56.2 |
| Top - 10     | 67.8   | 68.8   | 69.0 |
| Top - 20     | 70.4   | 71.4   | 71.8 |
| TableQA: WikiSQL | | | |
| Top - 1      | 80.5   | 81.9   | 84.0 |
| Top - 3      | 86.5   | 87.9   | 91.6 |
| Top - 5      | 88.4   | 90.0   | 94.0 |

FIG. 15

Q: How many different dog breeds from czecho-slovakia have the same temperament as the cairn terriers?

Gold S-expression:
(COUNT (AND (JOIN breed_temperament.breeds (JOIN animal_breed.place_of_origin m.01mk6)) (JOIN (R animal_breed.temperament) m.02z57c)))

Entity_Label_Mapping :
"m.01mk6" : "Czechoslovakia", "m.02z57c" : "Cairn Terrier"

RNG-KBQA :

Top-5 Ranked Logical Forms:
(COUNT (AND (JOIN (R breed_origin.breeds_originating_here) m.01mk6) (JOIN animal_breed.temperament (JOIN *(R animal_breed.temperament) m.02z57c)*)))
(COUNT (AND (JOIN animal_breed.place_of_origin m.01mk6) (JOIN animal_breed.temperament (JOIN *(R animal_breed.temperament) m.02z57c)*)))
(COUNT (AND (JOIN (R breed_origin.breeds_originating_here) m.01mk6) (JOIN animal_breed.temperament.breeds m.02z57c)))
(COUNT (AND (JOIN animal_breed.place_of_origin m.01mk6) (JOIN breed_temperament.breeds m.02z57c)))
(COUNT (AND (JOIN breed_temperament.breeds (JOIN (R breed_origin.breeds_originating_here) m.01mk6) (JOIN ( R animal_breed.temperament) m.02z57c))))

Final Output: (COUNT (AND (JOIN (R breed_origin.breeds_originating_here) m.01mk6) (JOIN animal_breed.temperament (JOIN
(R animal_breed.temperament) m.02z57c))))

FIG. 16A

Uni-Parser:

Top-5 Ranked <|firsthop|> and Filtered Top-5 Ranked <|secondhop|> Primitives :

<|firsthop|>
(R animal_breed.temperament) m.02z57c
breed_temperament.breeds m.02z57c
(R breed_origin.breeds_originating_here) m.01mk6
animal_breed.place_of_origin m.01mk6
(R animal_breed.breed_of) m.02z57c <|secondhop|>
breed animal_breed.temperament
temperament breed_temperament.breeds
temperament (R animal_breed.temperament)

*Final Output:* (COUNT (AND (JOIN breed_temperament.breeds (JOIN animal_breed.place_of_origin m.01mk6)) (JOIN (R animal_breed.temperament) m.02z57c)))

FIG. 16B

SYSTEMS AND METHODS FOR SEMANTIC PARSING WITH PRIMITIVE LEVEL ENUMERATION

CROSS REFERENCE(S)

The instant application is a nonprovisional of and claim priority under 35 U.S.C. 119 to U.S. provisional application No. 63/355,438, filed Jun. 24, 2022, which is hereby expressly incorporated by reference herein in its entirety.

TECHNICAL FIELD

The embodiments relate generally to natural language processing and machine learning systems, and more specifically to systems and methods for semantic parsing with primitive level enumeration for question answering.

BACKGROUND

Database operations, such as searching for a result in response to a search query, often require a command in a specific form. Writing the command in a specific logical form requires a user to master a high level of database language. Machine learning systems have been widely used in turning a natural language question into a query in a format used for a database or knowledge base. In this way, a user may enter a natural language query, such as "what is the month having the highest revenue in the past five years?" Parsing natural language questions into executable logical forms is a useful and interpretable way to perform question answering on structured data. Existing approaches enumerate executable logical forms, where the number of logical forms enumerated grows exponentially when dealing with complex questions with multi-hop/multi-table relations. Further, existing approaches rely on different model structures for different data modalities (e.g., knowledge bases and databases) rather than a unified adaptable structure. Therefore, there is a need for improved systems and methods of semantic parsing.

BRIEF DESCRIPTION OF THE DRAWINGS

FIGS. 11-15 provide charts illustrating exemplary performance of different embodiments described herein.

FIG. 16 provides an exemplary comparison of an output of the semantic parsing framework described in embodiments herein to another semantic parser.

Figure 1:
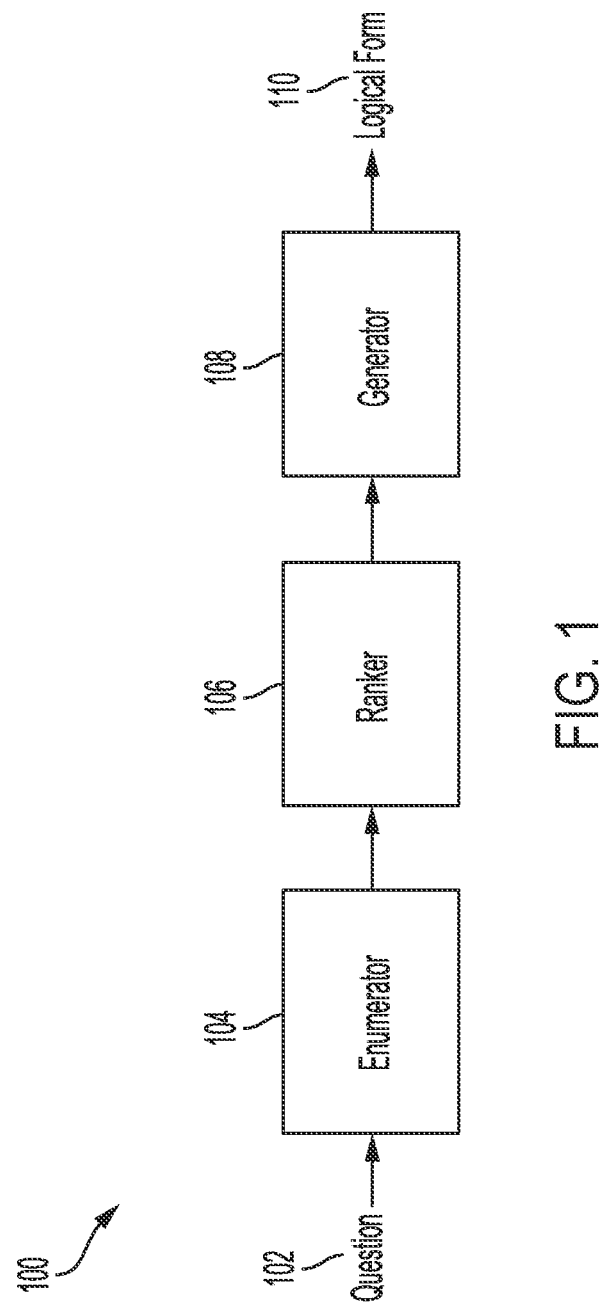
FIG. 1 is a simplified diagram illustrating a semantic parsing framework according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Parsing natural language questions to generate executable logical forms that can be executed on a database or knowledge base is a useful and interpretable way to perform question answering on structured data. For example, a natural language question such as "How many students are enrolled in Statistics?" may be answerable given a database which contains student data. A semantic parser may generate a logical form which may be executed by the database in order to provide an answer, e.g., SELECT count(*) FROM Courses JOIN Course_Attendance ON Courses.CourseId=Course_Attendance.CourseId WHERE Courses.CourseName="Statistics". Existing approaches for semantic parsing enumerate executable logical forms. For example, when the data is structured as a knowledge base, entities may be interconnected by edges which represent relationships. An existing approach enumerates logical forms starting with the entity and including relations for two "hops" away in the structure. Given M connections to entities one hop away from the starting entity, and N connections from each of those entities, this results in M*N logical forms. For sufficiently complex data structures, this results in inefficient resource usage, and results in poor performance. Further, existing approaches do not provide a unified structure that is applicable to both knowledge bases and databases.

In view of the need for improved systems and methods for semantic parsing, embodiments described herein provide a semantic parsing framework (referred to as "Uni-Parser") that may be applied to question answering on both knowledge bases and databases. The Uni-Parser framework may generate one or more logical form that can be executed on a data structure in response to a natural language input, through enumeration, ranking, and generation. At the enumeration stage, primitives are enumerated based on matching the natural language question to the data structure (e.g., either a database or knowledge base). For example, primitives in a database may be a column name of a specific table, or a value of a specific cell in a table (or an operation which would provide the relevant cell value as an output), etc. In a knowledge base, a primitive may be represented by a node in the graph. This is opposed to a logical form which is composed of primitives and corresponding operations upon the primitives, which for a database, for example, may be: SELECT count(*) FROM Courses JOIN Course_Attendance ON Courses.CourseID=Course_Attendance.CourseID WHERE Courses.CourseName="Statistics". This logical form includes a number of primitives corresponding to column names for specific tables such as "Courses.CourseID" and cell values such as "Statistics." Rather than enumerating all the possible logical forms with all different variations and/or combinations of the primitives, Uni-Parser enumerates the primitives themselves. In this way, rather than M*N logical forms being enumerated (Where M is the number of first hop entities and N is the number of second hop entities from a specific entity in the natural language question in the knowledge base), Uni-Parser may enumerate M+N primitives.

After enumerating primitives, the Uni-Parser framework may rank the primitives used a trained ranker model. The top ranked primitives may then be used as inputs to a generator, which is a learned sequence to sequence model. The sequence-to-sequence model may then produce an output sequence of a logical form in response to an input sequence of the top ranked primitives. Details of the enumeration, ranking, and generation stages are described in more detail below with respect to FIGS. 1-7.

Embodiments described herein provide a number of benefits. For example, the same semantic parsing framework may be used for both database and knowledge base question answering. By enumerating primitives rather than logical forms, the search space is greatly reduced, which makes candidate generation and ranking more efficient and scalable. Further, the composition of logical forms from primitives and operations is postponed to the generation phase. This leads to a more generalized model that can work on complex logical forms and generalize to questions involving unseen schema.

FIG. 1 is a simplified diagram illustrating a semantic parsing framework 100 according to some embodiments. The framework 100 comprises an enumerator 104, operatively connected to a ranker 106, which is operatively connected to a generator 108. A natural language question 102 (e.g., How many students are enrolled in Statistics?") may be an input to enumerator 104. Given the question 102 and a known data structure (e.g., such as a knowledge base comprising a plurality of entities that are interconnected by edges representing the relationships between the entities or a database comprising one or more tables each with respective columns and rows which store values), enumerator 104 may enumerate a number of primitives. For example, for a given entity indicated in question 102, the first-hop and second-hop entities from the given entity in the knowledge base may be enumerated as primitives. Enumeration of primitives is described in more detail with respect to FIG. 2 for knowledge bases, and FIG. 3 for databases.

Enumerated primitives may be passed to ranker 106 which ranks the primitives based on the question 102. Ranker 106 may be a learned model which is trained on a similar or the same data structure. Ranker 106 is described in more detail with respect to FIG. 4 for knowledge bases, and FIG. 5 for databases.

The top ranked primitives may be passed to generator 108. Based on the question 1-2 and the ranked primitives, generator 108 may produce logical form 110. Logical form 110 may be executed on the data structure to provide an answer to question 102. Generator 108 may be a learned model which is trained on a similar or the same data structure. Generator 108 is described in more detail with respect to FIG. 6 for knowledge bases, and FIG. 7 for databases.

Figure 2:
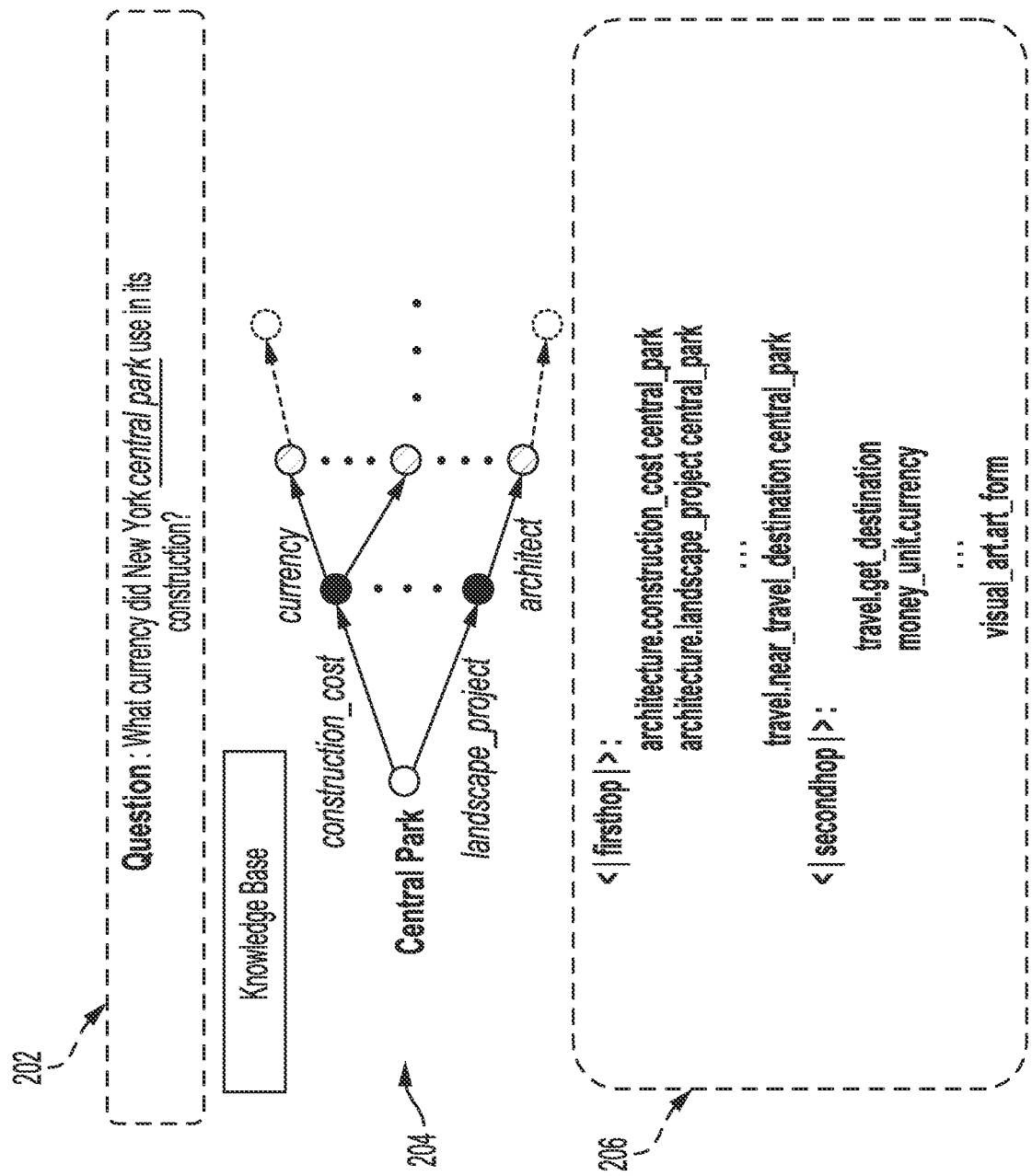
FIG. 2 is a simplified diagram illustrating enumeration of primitives for a knowledge base according to some embodiments.

FIG. 2 is a simplified diagram illustrating enumeration of primitives for a knowledge base according to some embodiments. Based on the provided question 202, an enumerator (e.g., enumerator 104 of FIG. 1) may enumerate primitives from knowledge base 204. The enumerator may start by detecting entities in the question 202, for example by using a named entity recognition (NER) algorithm. For example, name entities such as "currency," "New York," "Central Park," "construction" may be identified in the question 202. In some embodiments, the NER algorithm identifies entities in the question 202 based on belonging to a predetermined class of entities (e.g., location, person, etc.).

The identified entities in question 202 may then be matched (or fuzzy matched) to entities in knowledge base 204. For example, "Central Park" may be selected as a starting entity based on matching this entity to words "central park" in question 202.

In some embodiments, only one entity is selected from knowledge base 204, while in other embodiments two or more may be selected. The matched entity (or entities) may be used as a starting point for enumeration. To alleviate the issue of entity disambiguation, a ranker model may be used to select entity candidates based on the similarity between the question and the one-hop in/out relations of the entity.

After selecting one or more starting entities, the enumerator may enumerate all primitives within two hops of the starting entities on a knowledge base. Entities one hop away from "Central Park" shown enumerated in list 206 as reflected in knowledge base 204 may include items such as "architecture.construction_cost central_park," and "architecture.landscape_project central_park." At a second hop from "central park" may include additional entities such as "travel.get_destination," and "money_unit.currency." As shown in list 206, the enumeration is done at the level of primitives, the base unit of the knowledge base, rather than on queries which are constructed of primitives and operations on the primitives.

Figure 3:
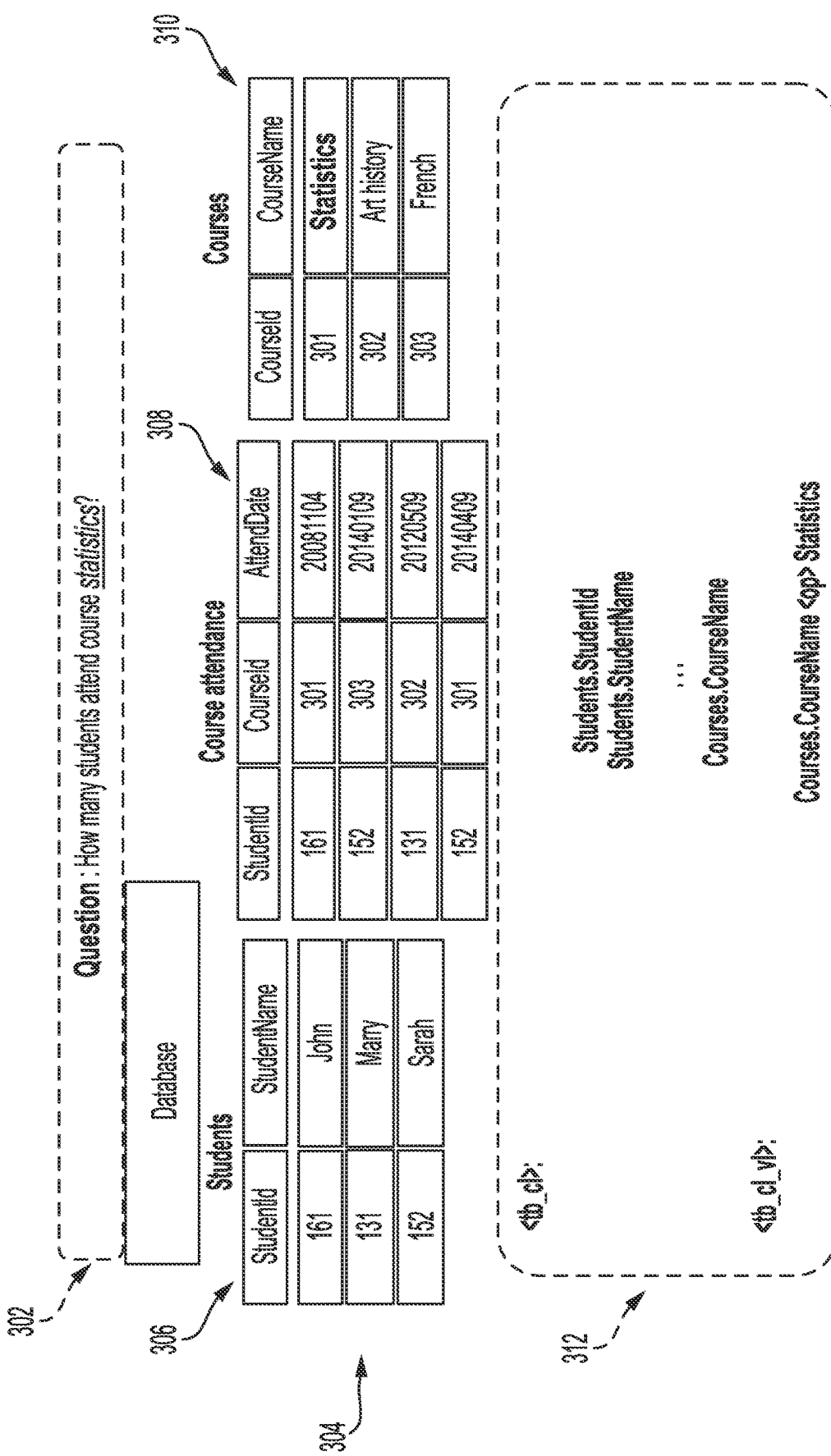
FIG. 3 is a simplified diagram illustrating enumeration of primitives for a database according to some embodiments.

FIG. 3 is a simplified diagram illustrating enumeration of primitives for a database according to some embodiments. Based on the provided question 302, an enumerator (e.g., enumerator 104 of FIG. 1) may enumerate primitives from database 304. For databases, a primitive for any input question may include a column name or a cell value. For example, for a database that includes one or more data tables, all column names of all data tables may be enumerated first, and only relevant cell values within the one or more data tables may be enumerated next based on the input question. As the number of column names is generally manageable even for very large databases, every column name for every table in the database may be enumerated. For example, as shown in enumerated list 310, column names (as associated with their tables) are enumerated including Students.StudentId, Students.StudentName (both from table 306), not shown are the columns from table 308 which would be included, and the column names from table 310 are also included, as illustrated by the exemplary Courses.CourseName entry.

For the enumeration of individual cells, the amount of individual cells may be too large to enumerate efficiently. Rather than enumerating every cell, the enumerator may detect entities in the question 302, for example by using a named entity recognition algorithm, e.g., "students," "course," "statistics" may be detected from question 302.

The entities in question 302 may then be matched (or fuzzy matched) to cell values in database 304. For example, as illustrated, question 302 contains the word "statistics" which matches the cell value "Statistics" in the CourseName column of table 308 of all courses. This is therefore shown in enumerated list 310 as "Courses.CourseName <op> Statistics" which maintains its relation to table 308 and the CourseName column. In some embodiments, if question 302 contains a numeric value, and string match fails to detect a match, the value is paired with all column names in the database.

Figure 4:
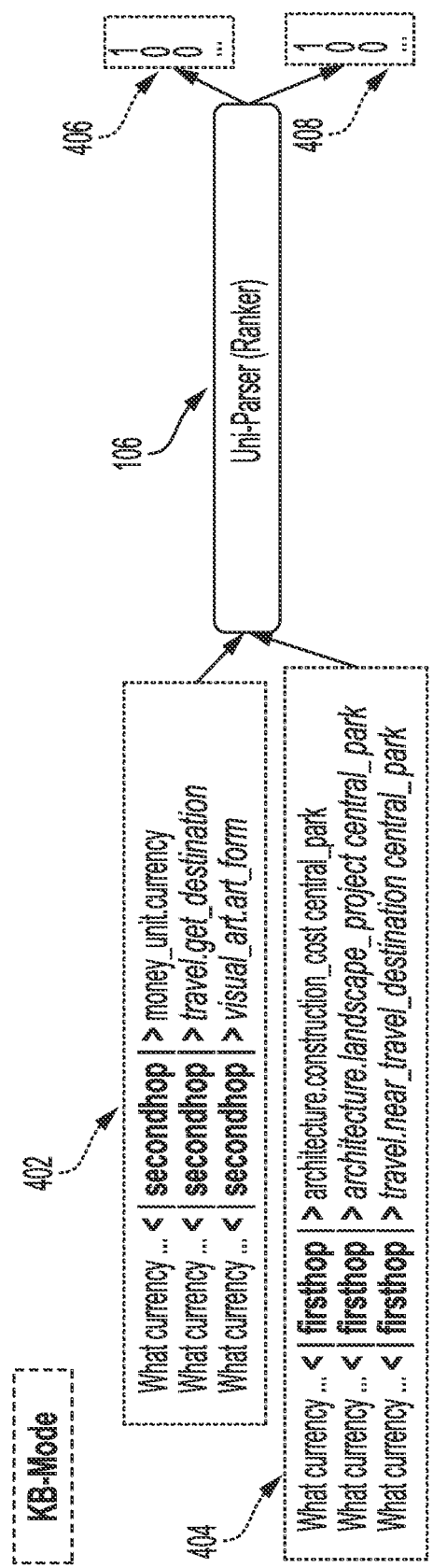
FIG. 4 is a simplified diagram illustrating ranking primitives for a knowledge base according to some embodiments.

FIG. 4 is a simplified diagram illustrating ranking primitives for a knowledge base according to some embodiments. Enumerated lists 402 and 404 are lists of first hop and second hop primitives as enumerated by an enumerator (e.g., enumerator 104) as discussed with reference to FIGS. 1-2. In some embodiments, the same ranker 106 model may be used for both classes of primitives (e.g., both first hop and second hop).

In some embodiments, and as illustrated in FIG. 4, the enumerated lists provided by the enumerator may be concatenated (either by the enumerator, ranker, or as another unit) with the question, a special token indicating first/second hop, and the primitive itself. For example, enumerated list 404 includes items which start with the text of question 202 of FIG. 2, a special first-hop token "<|firsthop|>" and the primitives such as "architecture.construction_cost central_park." Table 402 includes similar items which are concatenated with the question 202, a second-hop token, followed by the primitive. These are exemplary patterns of concatenation, and others may be used. The enumerated lists are provided to ranker 106.

Ranker 106 (as discussed in FIG. 1) may be trained to filter out irrelevant primitives by measuring the similarity between questions and enumerated primitive candidates (e.g., as shown in lists 402, 404). In some embodiments the ranker 106 utilizes a cross-encoder architecture. Given a question X and a primitive p with a category token $p_c$, ranker 106 may use a BERT-based encoder that takes as input the concatenation of their vector representations, and outputs a logit representing the similarity between the primitive and the question:

$$s(X,p,pc)=FFN(\psi\theta(pc \oplus X \oplus p))$$

where $\oplus$ denotes a concatenation operation. $\psi\theta$ denotes the [CLS] representation of the concatenated input after BERT embedding; FNN is a projection layer reducing the representation to a scalar similarity score. $p_c$ is the special token to distinguish the category of the primitive (in knowledge base, $p_c \in \{$<|firsthop|>, <|secondhop|>$\}$ and in database, $p_c \in \{$<|tb_cl|>, <|tb_cl_vl|>$\}$). The ranker is optimized to minimize the contrastive loss:

$$\mathcal{L}_\theta(X, p^+, \mathcal{P}^-, p_c) = -\frac{e^{s(X,p^+,p_c)}}{\sum_{p \in \{p^+\} \cup \mathcal{P}^-} e^{s(X,p,p_c)}}$$

where p+ is the positive primitive extracted from the ground-truth logical form and P⁻ is the set of negative primitives from the same category $p_c$.

In order to pair negative primitive samples with positive samples when training ranker 106, negative sampling may be performed. In some embodiments, random sampling is used to select negative samples. In other embodiments, a sampling strategy samples hard negative candidates for training the ranker 106. In cases of knowledge bases, the hard negative candidates of the second hop may be sampled from the primitives connected to the ground truth first hop. Moreover, a bootstrap negative sampling strategy may be leveraged; that is, the model may be trained recursively using the false positive candidates generated from the last training epoch.

At inference, ranker 106 may generate an output value associated with each of the enumerated primitives. Based on those values, the primitives may be ranked. In some embodiments, first-hop/second-hop primitives are separately ranked (or column name/cell values for databases). This is illustrated as ranked lists 406 and 408 in FIG. 4 for knowledge bases. In some embodiments, the top k primitives of each category may be selected to be passed on to a generator (e.g., generator 108). For example, k may be set to 5. In knowledge bases, the top ranked first hop primitives and second hop primitives can be formed into two-hop paths by combining one first hop primitive with each of the second hop primitives. However, to provide valid primitive candidates to the generator 108, they may be further filtered to remove the second hop primitives that cannot be reached from any of the first hop primitives.

Figure 5:
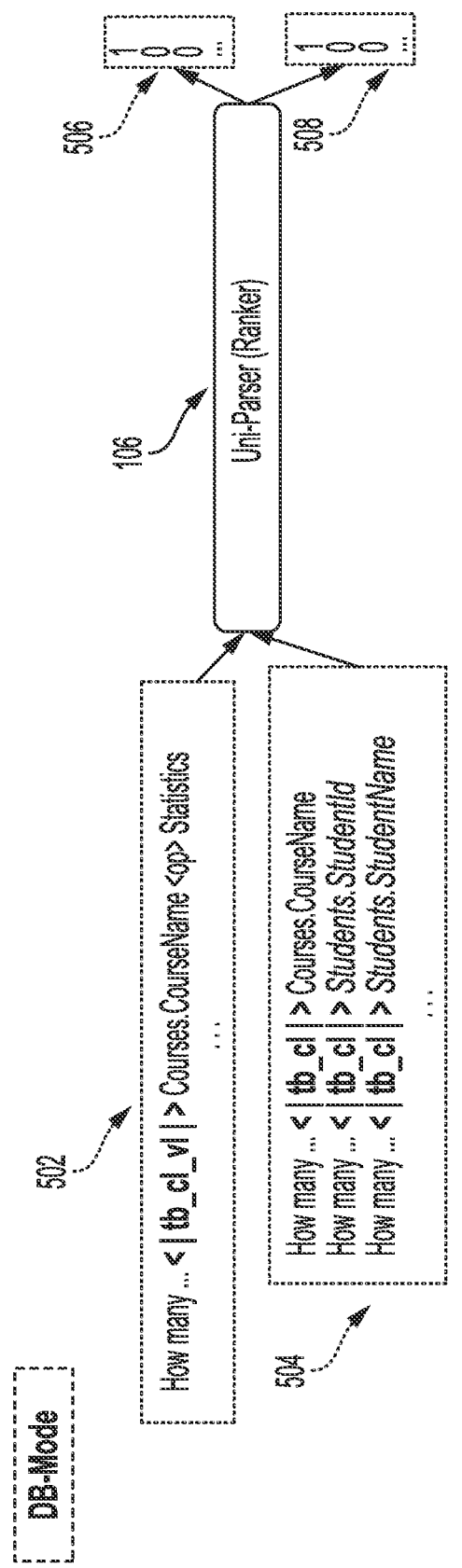
FIG. 5 is a simplified diagram illustrating ranking primitives for a database according to some embodiments.

FIG. 5 is a simplified diagram illustrating ranking primitives for a database according to some embodiments. Enumerated lists 502 and 504 are lists of column names and cell value primitives as enumerated by an enumerator (e.g., enumerator 104) as discussed with reference to FIGS. 1 and 3.

In some embodiments, and as illustrated in FIG. 5, the enumerated lists provided by the enumerator may be concatenated (either by the enumerator, ranker, or as another unit) with the question, a special token indicating whether the primitive is a column name or a cell value, and the primitive itself. For example, enumerated list 502 includes a single item which starts with the text of question 302 of FIG. 3, a special cell value token "<|tb_cl_vl|>" and the primitive "Courses.CourseName <op> Statistics." Table 504 includes similar items which are concatenated with the question 202, a column-name token, followed by the primitive. These are exemplary patterns of concatenation, and others may be used. The enumerated lists are provided to ranker 106.

The training and utilization of ranker 106 may be generally the same as described with reference to databases in FIG. 4. Rather than the enumerated knowledge base primitives, the enumerated database primitives would be applied. In selecting hard negatives for training ranker 106 on databases, for <|tb_cl|> category primitives, the training method may treat those having the same table name with ground truth but different column names as the hard negatives. And for the <|tb_cl_vl|> category, the training method may treat candidates with the same table and column name with ground truth, but having a different cell value as the hard negative.

Ranked lists 506 and 508 similarly provide a ranking of the database primitives as discussed with respect to ranked lists 406 and 408 in FIG. 4 for knowledge bases.

Figure 6:
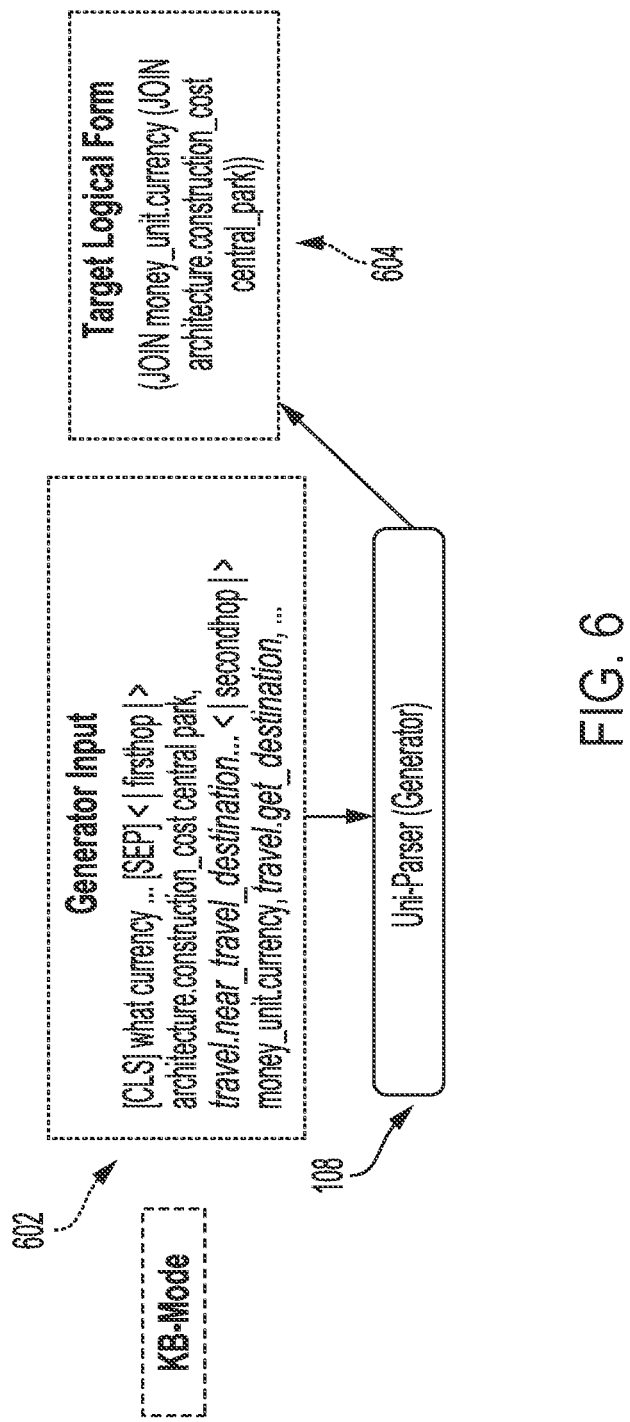
FIG. 6 is a simplified diagram illustrating generating logical forms for a knowledge base according to some embodiments.

FIG. 6 is a simplified diagram illustrating generating a logical form for a knowledge bases according to some embodiments. For knowledge bases, generator 108 receives input 602 which is the top ranked primitives (concatenated with the question and special tokens) from the ranker 106. In some embodiments, the primitives order may be randomized so that generator 108 does not misuse the positional information to just learn to select the top ranked primitives, and instead must learn to use the semantic meaning.

Generator 108 may learn to generate logical forms (queries which are composed of primitives and may be executed on the corresponding data structure) by understanding the meaning of its elements (primitives and operations) and composing them. Generator 108 may be trained to generate the output logical form token-by-token, optimized by cross-entropy loss. At inference, beam-search may be used to decode top-k target logical forms in an autoregressive manner.

An exemplary logical form output 604 is illustrated. As shown, output 604 in is: (JOIN money_unit.currency (JOIN architecture.construction_cost central_park)). Note that the logical form is composed of the primitives including entities of the knowledge base, and operations performed on those entities (e.g., JOIN). This logical form may be used as a query against the knowledge base to provide an answer to the question (e.g., question 102 or 202).

Figure 7:
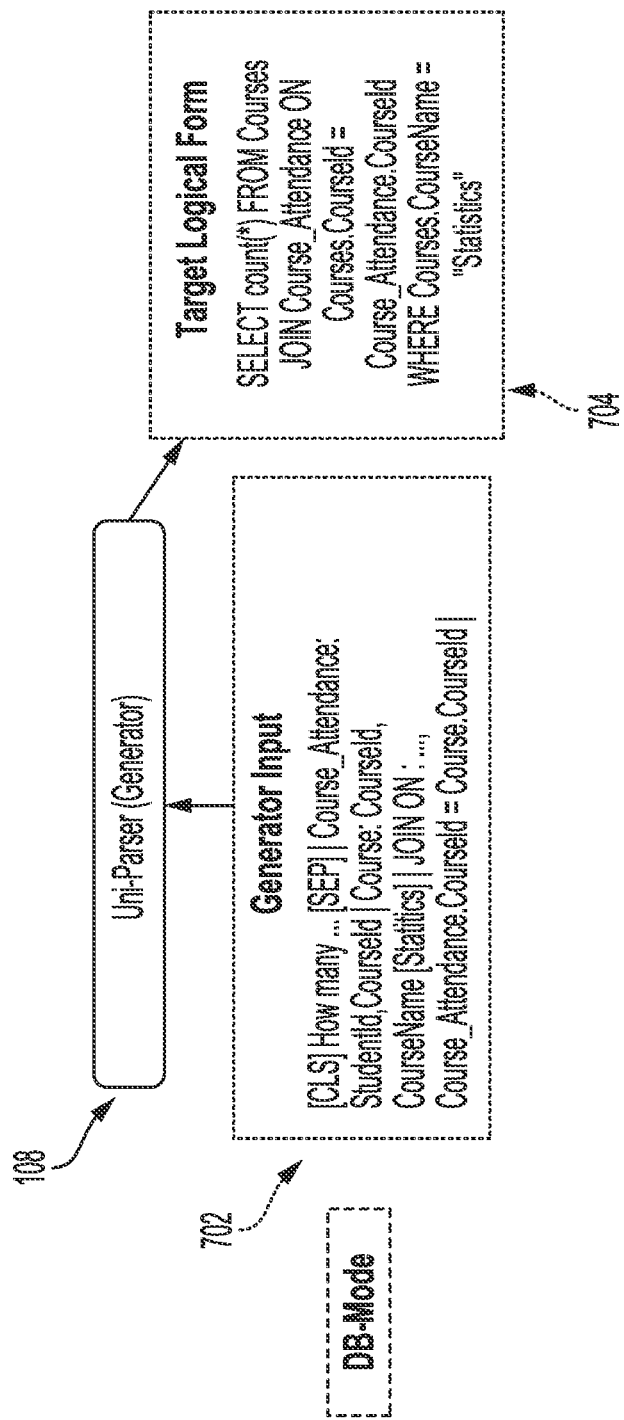
FIG. 7 is a simplified diagram illustrating generating logical forms for a database according to some embodiments.

FIG. 7 is a simplified diagram illustrating generating a logical form for a database according to some embodiments. Generally, the training and utilization of generator 108 is the same for databases as described for knowledge bases in FIG. 6.

For databases, generator 108 receives input 702 which includes the top ranked primitives from ranker 106, but formatted as: [Question; |table_name1| column_name1, column_name2<op> value . . . | table_name|2 . . . ]. For databases, the formatting of putting column names and cell values organized according to the table they belong to naturally changes the order of them from their ranked order.

As illustrated, an output may be generated such as output 704 which is: SELECT count(*) FROM Courses JOIN Course_Attendance ON Courses.CourseId=Course_Attendance.CourseId WHERE Courses.CourseName="Statistics". Similar to the logical form described in FIG. 6, this logical form output 704 may be used as a query against the database to provide an answer to the question (e.g., question 102, or 302).

Figure 8:
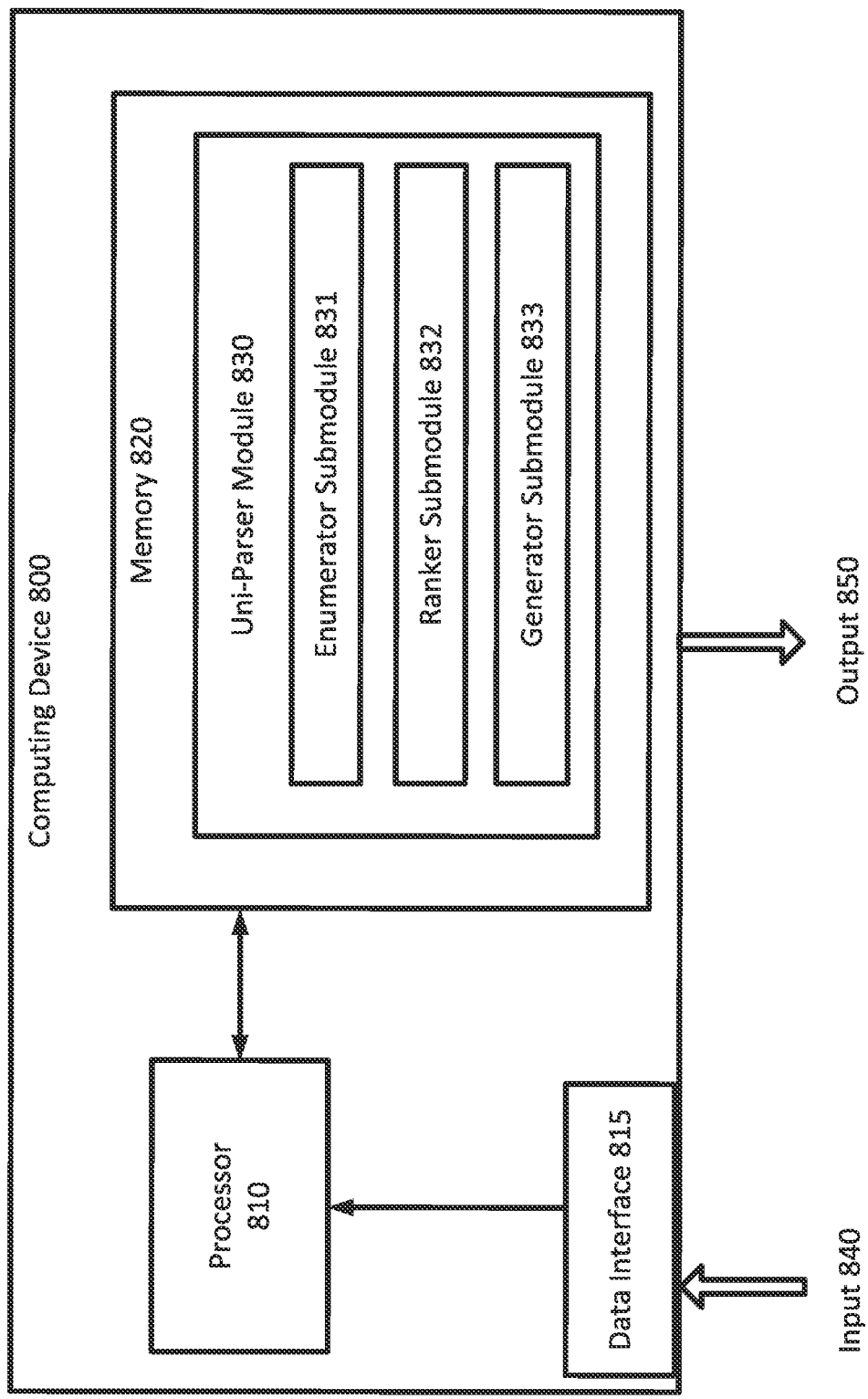
FIG. 8 is a simplified diagram illustrating a computing device implementing the semantic parsing framework described in FIGS. 1-7, according to one embodiment described herein.

FIG. 8 is a simplified diagram illustrating a computing device implementing the Uni-Parser framework described in FIGS. 1-7, according to one embodiment described herein. As shown in FIG. 8, computing device 800 includes a processor 810 coupled to memory 820. Operation of computing device 800 is controlled by processor 810. And although computing device 800 is shown with only one processor 810, it is understood that processor 810 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 800. Computing device 800 may be implemented as a stand-alone subsystem, as a board added to a computing device, and/or as a virtual machine.

Memory 820 may be used to store software executed by computing device 800 and/or one or more data structures used during operation of computing device 800. Memory 820 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 810 and/or memory 820 may be arranged in any suitable physical arrangement. In some embodiments, processor 810 and/or memory 820 may be implemented on a same board, in a same package (e.g., system-in-package), on a same chip (e.g., system-on-chip), and/or the like. In some embodiments, processor 810 and/or memory 820 may include distributed, virtualized, and/or containerized computing resources. Consistent with such embodiments, processor 810 and/or memory 820 may be located in one or more data centers and/or cloud computing facilities.

In some examples, memory 820 may include non-transitory, tangible, machine readable media that includes executable code that when run by one or more processors (e.g., processor 810) may cause the one or more processors to perform the methods described in further detail herein. For example, as shown, memory 820 includes instructions for Uni-Parser module 830 that may be used to implement and/or emulate the systems and models, and/or to implement any of the methods described further herein. An Uni-Parser module 830 may receive input 840 such as an input training data (e.g., questions and corresponding logical forms) via the data interface 815 and generate an output 850 which may be a logical form based on a question for a given data structure.

The data interface 815 may comprise a communication interface, a user interface (such as a voice input interface, a graphical user interface, and/or the like). For example, the computing device 800 may receive the input 840 (such as a training dataset) from a networked database via a communication interface. Or the computing device 800 may receive the input 840, such as a question and/or a data structure, from a user via the user interface.

In some embodiments, the Uni-Parser module 830 is configured to produce a logical form for answering a question with a provided data structure. The Uni-Parser module 830 may further include an enumerator submodule 831 (e.g., similar to enumerator 104 in FIG. 1), a ranker submodule 832 (e.g., similar to ranker 106 in FIG. 1), and a generator submodule 833 (e.g., similar to generator 108 in FIG. 1). In one embodiment, the Uni-Parser module 830 and its submodules 831-833 may be implemented by hardware, software and/or a combination thereof.

Some examples of computing devices, such as computing device 800 may include non-transitory, tangible, machine readable media that include executable code that when run by one or more processors (e.g., processor 810) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 9:
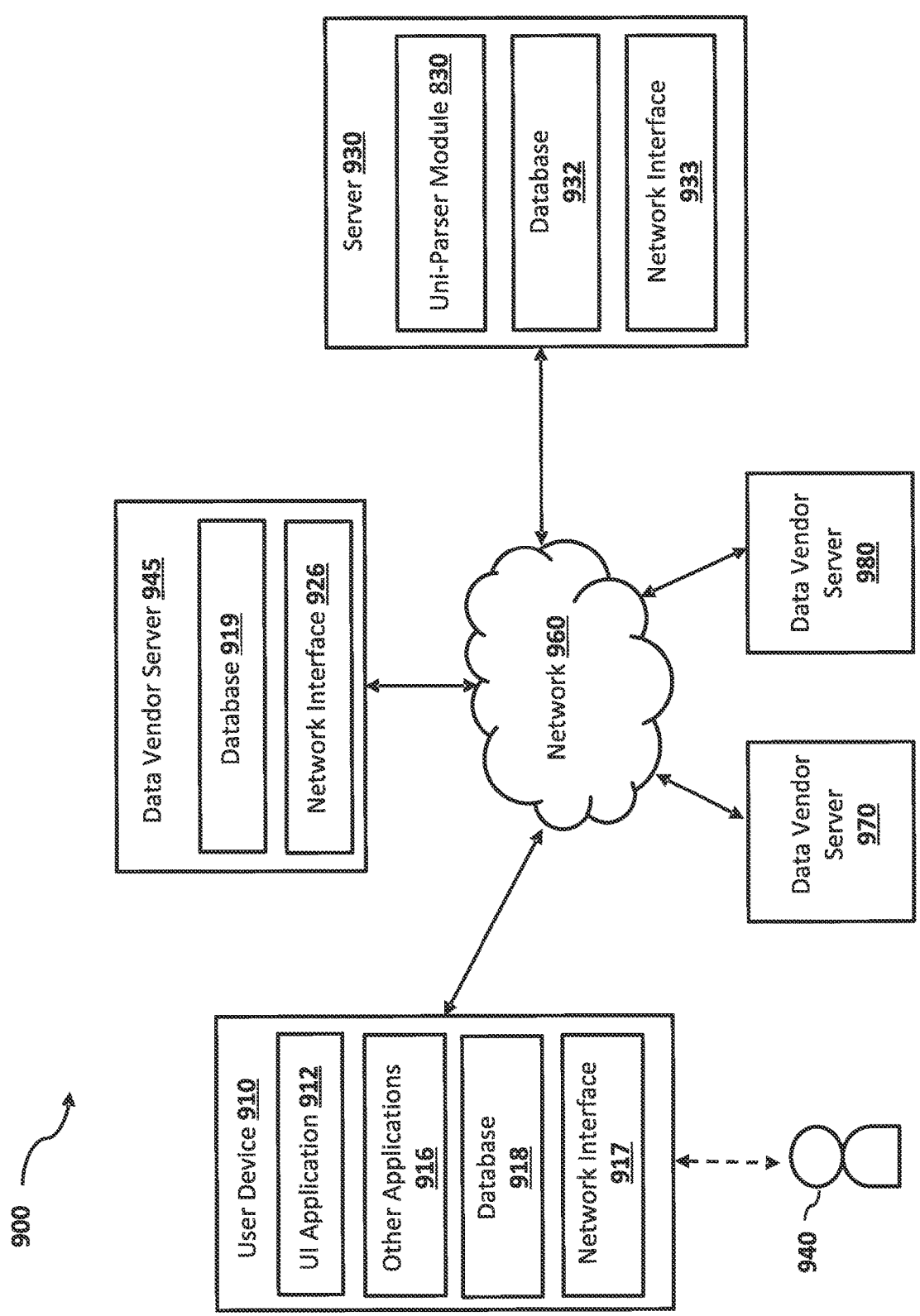
FIG. 9 is a simplified block diagram of a networked system suitable for implementing the semantic parsing framework described in FIGS. 1-7 and other embodiments described herein.

FIG. 9 is a simplified block diagram of a networked system suitable for implementing the Uni-Parser framework described in FIGS. 1-7 and other embodiments described herein. In one embodiment, block diagram 900 shows a system including the user device 910 which may be operated by user 940, data vendor servers 945, 970 and 980, server 930, and other forms of devices, servers, and/or software components that operate to perform various methodologies in accordance with the described embodiments. Exemplary devices and servers may include device, stand-alone, and enterprise-class servers which may be similar to the computing device 800 described in FIG. 8, operating an OS such as a MICROSOFT® OS, a UNIX® OS, a LINUX® OS, or other suitable device and/or server-based OS. It can be appreciated that the devices and/or servers illustrated in FIG.

9 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 910, data vendor servers 945, 970 and 980, and the server 930 may communicate with each other over a network 960. User device 910 may be utilized by a user 940 (e.g., a driver, a system admin, etc.) to access the various features available for user device 910, which may include processes and/or applications associated with the server 930 to receive an output data anomaly report.

User device 910, data vendor server 945, and the server 930 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 900, and/or accessible over network 960.

User device 910 may be implemented as a communication device that may utilize appropriate hardware and software configured for wired and/or wireless communication with data vendor server 945 and/or the server 930. For example, in one embodiment, user device 910 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 910 of FIG. 9 contains a user interface (UI) application 912, and/or other applications 916, which may correspond to executable processes, procedures, and/or applications with associated hardware. For example, the user device 910 may receive a message indicating a logical form or a direct answer to a question from the server 930 and display the message via the UI application 912. In other embodiments, user device 910 may include additional or different modules having specialized hardware and/or software as required.

In various embodiments, user device 910 includes other applications 916 as may be desired in particular embodiments to provide features to user device 910. For example, other applications 916 may include security applications for implementing client-side security features, programmatic client applications for interfacing with appropriate application programming interfaces (APIs) over network 960, or other types of applications. Other applications 916 may also include communication applications, such as email, texting, voice, social networking, and IM applications that allow a user to send and receive emails, calls, texts, and other notifications through network 960. For example, the other application 916 may be an email or instant messaging application that receives a query result message from the server 930. Other applications 916 may include device interfaces and other display modules that may receive input and/or output information. For example, other applications 916 may contain software programs for asset management, executable by a processor, including a graphical user interface (GUI) configured to provide an interface to the user 940 to view an answer to a question.

User device 910 may further include database 918 stored in a transitory and/or non-transitory memory of user device 910, which may store various applications and data and be utilized during execution of various modules of user device 910. Database 918 may store user profile relating to the user 940, predictions previously viewed or saved by the user 940, historical data received from the server 930, and/or the like. In some embodiments, database 918 may be local to user device 910. However, in other embodiments, database 918 may be external to user device 910 and accessible by user device 910, including cloud storage systems and/or databases that are accessible over network 960.

User device 910 includes at least one network interface component 917 adapted to communicate with data vendor server 945 and/or the server 930. In various embodiments, network interface component 917 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 945 may correspond to a server that hosts database 919 to provide training datasets including questions and corresponding logical forms to the server 930. The database 919 may be implemented by one or more relational database, distributed databases, cloud databases, and/or the like.

The data vendor server 945 includes at least one network interface component 926 adapted to communicate with user device 910 and/or the server 930. In various embodiments, network interface component 926 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 945 may send asset information from the database 919, via the network interface 926, to the server 930.

The server 930 may be housed with the Uni-Parser module 830 and its submodules described in FIG. 1. In some implementations, Uni-Parser module 830 may receive data from database 919 at the data vendor server 945 via the network 960 to generate logical forms and/or direct answers to questions. The generated logical forms and/or answers may also be sent to the user device 910 for review by the user 940 via the network 960.

The database 932 may be stored in a transitory and/or non-transitory memory of the server 930. In one implementation, the database 932 may store data obtained from the data vendor server 945. In one implementation, the database 932 may store parameters of the Uni-Parser module 830. In one implementation, the database 932 may store previously generated logical forms, and the corresponding input feature vectors.

In some embodiments, database 932 may be local to the server 930. However, in other embodiments, database 932 may be external to the server 930 and accessible by the server 930, including cloud storage systems and/or databases that are accessible over network 960.

The server 930 includes at least one network interface component 933 adapted to communicate with user device 910 and/or data vendor servers 945, 970 or 980 over network 960. In various embodiments, network interface component 933 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 960 may be implemented as a single network or a combination of multiple networks. For example, in various embodiments, network 960 may include the Internet or one or more intranets, landline networks, wireless networks, and/or other appropriate types of networks. Thus, network 960 may correspond to small scale communication networks, such as a private or local area network, or a larger scale network, such as a wide area network or the Internet, accessible by the various components of system 900.

Figure 10:
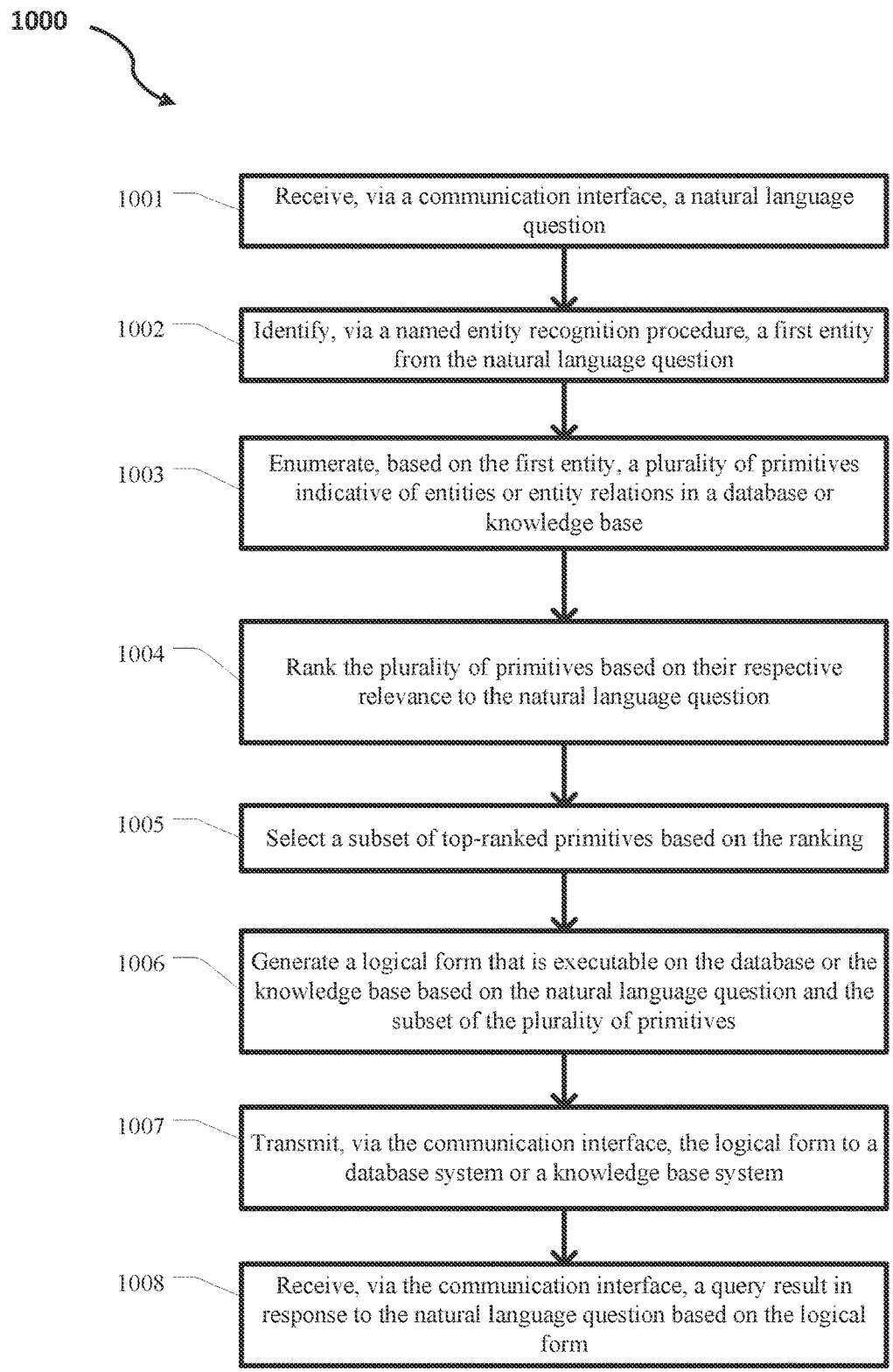
FIG. 10 is an example logic flow diagram illustrating a method of semantic parsing based on the framework shown in FIGS. 1-9, according to some embodiments described herein.

FIG. 10 is an example logic flow diagram illustrating a method 1000 of semantic parsing based on the Uni-Parse framework shown in FIGS. 1-9, according to some embodiments described herein. One or more of the processes of method 1000 may be implemented, at least in part, in the form of executable code stored on non-transitory, tangible, machine-readable media that when run by one or more processors may cause the one or more processors to perform one or more of the processes. In some embodiments, method 1000 corresponds to the operation of the Uni-Parser module 830 (e.g., FIGS. 8-9) that performs semantic parsing.

As illustrated, the method 1000 includes a number of enumerated steps, but aspects of the method 1000 may include additional steps before, after, and in between the enumerated steps. In some aspects, one or more of the enumerated steps may be omitted or performed in a different order.

At step 1001, a system receives, via a communication interface, a natural language question (e.g., question 102, 202, or 302). For example, the question may be input to a user-interface by a user. The communication interface may be, for example, a network interface of a computer, where the natural language question is received at a server (e.g., server 930) via a network interface (e.g., network interface 933) from a user device (e.g., user device 910).

At step 1002, the system identifies, via a named entity recognition (NER) procedure, a first entity from the natural language question. For example, the first entity may be a node in a knowledge graph such as "Central Park" as discussed in FIG. 2. For a database, the first entity may be a cell value such as "Statistics" as described in FIG. 3.

At step 1003, the system enumerates (e.g., by an enumerator 104), based on the first entity, a plurality of primitives indicative of entities or entity relations in a database or knowledge base. In a database, for example, primitives may include table column names and cell values (including the cell value matched to the first entity described at step 1002). In knowledge bases, for example, primitives may include entities and entity relations of the knowledge base (including the knowledge base entity matched to the first entity described at step 1002). In some embodiments, the knowledge base entity matched to the first entity is a starting entity, from which the other primitives are enumerated, being one hop or two hops from the starting entity.

At step 1004, the system ranks (e.g., by a ranker 106) the plurality of primitives based on their respective relevance to the natural language question. In some embodiments, separate ranked lists are generated for each class of primitive (e.g., first-hop and second-hop or column name and cell value). Primitives enumerated at step 1004 may be provided to the ranker in a form where they are concatenated with the natural language question and/or a special token identifying the class of the primitive (e.g., first-hop, second-hop, column name, or cell value). The ranker may be a model (e.g., a neural network model) which is trained to minimize a contrastive loss. The contrastive loos may be based on a positive primitive sample extracted from a ground-truth logical form, and a negative primitive sample. The method for selecting the negative primitive sample may be random, or may be selected as a "hard" sample which may improve training. For example, in knowledge bases the negative sample may be chosen from primitives connected in the knowledge base to a first hop entity extracted from a ground-truth logical form. For databases the negative sample may be selected by selecting a cell value in the same table and column as a cell value extracted from the ground-truth logical form.

At step 1005, the system selects a subset of top-ranked primitives based on the ranking. This may be performed by a ranker 106, generator 108, or another component of the system. The amount of primitives selected may be based on a predetermined value. When the ranked list includes multiple ranked lists (e.g., a "first-hop" list and a "second-hop" list), then each list may be ranked individually and the top-ranked primitives from each list may be selected.

At step 1006, the system generates (e.g., by a generator 108) a logical form that is executable on the database or the knowledge base based on the natural language question and the subset of the plurality of primitives. The executable logical form may include at least one primitive from the subset. Logical forms may be, for example, logical forms 604 or 704.

At step 1007, the system transmits, via a communication interface, the logical form to a database system or a knowledge base system. For example, the database system or knowledge base system may be a server such as data vendor server 945 described in FIG. 9, to which the logical form is transmitted so that the server may execute the logical form on the database (or knowledge base).

At step 1008, the system receives, via the communication interface, a query result in response to the natural language question based on the logical form. The answer may be displayed to a user, for example on the same user interface as was used to input the question.

FIGS. 11-15 provide charts illustrating exemplary performance of different embodiments described herein. Comparisons are made to Bert Ranking as described in Gu et al., Beyond iid: three levels of generalization for question answering on knowledge bases, In Proceedings of the Web Conference, pages 3477-3488, 2021; ReTrack as described in Chen et al., Retrack: a flexible and efficient framework for knowledge base question answering, in Proceedings of the 59th Annual Meeting of the Association for Computational Linguistics and the 11th International Joint Conference on Natural Language Processing: System Demonstrations, pages 325-336, 2021; UnifiedSKG as described in Xie et al., Unifiedskg: Unifying and multi-tasking structured knowledge grounding with text-to-text language models, arXiv: 2201.05966, 2022; RNG-KBQA as described in Ye et al., Rng-kbqa: Generation augmented iterative ranking for knowledge base question answering, arXiv:2109.08678, 2021; Topic Units as described in Lan et al., Knowledge base question answering with topic units, 2019; STAGG as described in Yih et al., Semantic parsing via staged query graph generation: Question answering with knowledge base, In Proceedings of the Joint Conference of the 53rd Annual Meeting of the ACL and the 7th International Joint Conference on Natural Language Processing of the AFNLP, 2015; QGG as described in Lan et al., Query graph generation for answering multi-hop complex questions from knowledge bases, Association for Computational Linguistics, 2020; CBR as described in Das et al., Case-based reasoning for natural language queries over knowledge bases, arXiv: 2104.08762, 2021; ArcaneQA as described in Gu and Su, Arcaneqa: Dynamic program induction and contextualized encoding for knowledge base question answering, arXiv: 2204.08109, 2022; Global-GNN as described in Bogin et al., Global reasoning over database structures for text-to-sql parsing, arXiv: 1908.11214, 2019; EditSQL as described in Zhang et al., Editing-based sql query generation for cross-domain context-dependent questions, arXiv: 1909.00786, 2019; T5-Base as described in Scholak et al., Picard: Parsing incrementally for constrained auto-regressive decoding from language models, arXiv: 2109.05093, 2021; RAT-SQL as described in Wang et al., Rat-sql: Relation-aware schema encoding and linking for text-to-sql parsers, arXiv: 1911.04942, 2019; BRIDGE as described in Lin et al., Bridging textual and tabular data for cross-domain text-to-sql semantic parsing, arXiv: 2012.12627, 2020; T5-3B as described in Scholak et al., Picard: Parsing incrementally for constrained auto-regressive decoding from language models, arXiv: 2109.05093, 2021; SQLova as described in Hwang et al., A comprehensive exploration on wikisql with table-aware word contextualization, arXiv: 1902.01069, 2019; X-SQL as described in He et al., X-sql: reinforce schema representation with context, arXiv: 1908.08113, 2019; IE-SQL as described in Ma et al., Mention extraction and linking for sql query generation, arXiv: 2012.10074, 2020; NL2SQL as described in Guo and Gao, Content enhanced bert-based text-to-sql generation, arXiv: 1910.07179, 2019; HydraNet as described in Lyu et al., Hybrid ranking network for text-to-sql, arXiv: 2008.04759, 2020; and TAPEX as described in Liu et al., Tapex: Table pre-training via learning a neural sql executor, arXiv: 2107.07653, 2021.

Datasets used in the comparisons include the test and dev datasets of GRAILQA as described in Gu et al., Beyond iid: three levels of generalization for question answering on knowledge bases, In Proceedings of the Web Conference, pages 3477-3488, 2021; Spider as described in Yu et al., Spider: A large-scale human labeled dataset for complex and cross-domain semantic parsing and text-to-sql task, arXiv: 1809.08887, 2018; and WikiSQL as described in Zhong et al., Seq2sql: Generating structured queries from natural language using reinforcement learning, arXiv: 1709.00103, 2017.

For the experiments, to construct the <|tb_cl_vl|> category primitives, relevant cell values related to the question were found. Given a question and DB, the string matching was computed between the arbitrary length of phrase in question and the list of cell values under each column of all tables. A fuzzy matching algorithm was used to match a question to a possible cell value mentioned in the DB. Also detected were the number value in the question and form all column names with the value as the primitives. The column name in the WikiSQL dataset is vague, like "No.", "Pick #", and "Rank", so the cell value was used to supplement the meaning of the column name. The matching cell value was used to locate the row and match the column name with the cell value in the same row. The primitive ranker was initiated using BERT-base-uncased. 48 negative candidates were sampled for each primitive category. The ranker was trained for 10 epochs using a learning rate of 1e-5 and a batch size of 8. Bootstrap hard negative sampling was conducted after every two epochs. Ground truth entity linking was used for enumerating training candidates. The generator was trained it using T5-base and 3B on Spider datasets. top-15<|tb_cl|> category primitives were used and top-5<|tb_cl_vl|> category primitives returned by the ranker and fine-tune the T5-base model for 200 epochs using a learning rate of 5e-5 and a batch size of 64. For the T5-3B model, it was run on 16 A100 GPUs with 100 epochs using a batch size of 1024. And on the WikiSQL dataset, T5-base and T5-large were used, and used top-5<|tb_cl|> category primitives and top-3<|tb_cl_vl|> category primitives as the input of the generator. the T5-base/large model was fine-tuned for 20 epochs using a learning rate of 3e-5 and a batch size of 16.

FIGS. 11-12 illustrate exact match (EM) and F1 scores on test/dev split of the GRAILQA comparing alternative methods to an embodiment of the methods described herein (Uni-Parse). The reported models are based on BERT-base model for ranker and T5-base for generator. Best results among dev are bolded and the results of test better than dev are underlined. As shown, the embodiment tested (Uni-Parser) generally outperformed the prior methods. Compared with the methods enumerating logical forms like Bert Ranking and RNG-KBQA, the approach described herein achieves better performance in compositional and zero-shot settings. Especially, demonstrated was 3.1% improvement over baselines on F1 in the compositional setting. This matches the expectation that the generator learns the composition of the primitives.

FIGS. 13-14 summarize the results on the Spider and WikiSQL datasets respectively. On the Spider dataset, Uni-Parser achieves competitive performance against all baseline models. Compared with generation models the use whole DB table schema as input like BRIDGE and Unified-SKG, Uni-Parser achieves 3% improvement, suggesting the advantage of the method. Compared with the other T5-3B models, Uni-Parser achieves comparable performance with fewer training epochs. The upper block of FIG. 14 shows the comparison between the small pre-trained model, and the lower block shows the comparison of the large pre-trained model.

FIG. 15 illustrates the effects of hard negative strategies in ranking on WebQSP and WikiSQL datasets. No CG means that primitives are not differentiated by their categories. No CG shows lower performance than the setting using categories in the input. By comparing settings of with and without hard negative (right-most two columns), it is shown that the proposed hard negative sampling can help the ranker to better determine the positive primitive from the negative ones.

FIG. 16 provides an exemplary comparison of an output of the semantic parsing framework described in embodiments herein to another semantic parser. The top-5 ranked logical forms using RNG-KBQA contain much redundant information between each other, and none of them equals the gold logical expression. In contrast, the Uni-Parser method top-5 ranked expressions finds the correct first and second hop primitives and generates the correct logical form. Not that even though proper primitive is not ranked as the top-1, the generator has the capability to correctly select it.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of generating for a natural language question a logical form, the method comprising:
   receiving, via a communication interface, the natural language question;
   identifying, via a named entity recognition procedure, a first entity from the natural language question;
   enumerating, by an enumerator based on the first entity, a plurality of primitives indicative of entities or entity relations in a database or a knowledge base;
   ranking, by a ranker module, the plurality of primitives based on their respective relevance to the natural language question;
   selecting a subset of top-ranked primitives based on the ranking;
   generating, by a neural network based generator, the logical form based on the natural language question and the subset of the plurality of primitives, wherein the logical form is executable on the database or the knowledge base and includes one or more of the plurality of primitives and one or more operations upon the one or more of the plurality of primitives;
   transmitting, via the communication interface, the logical form to a database system or a knowledge base system; and
   receiving, via the communication interface, a query result in response to the natural language question based on the logical form.

2. The method of claim 1, further comprising:
   identifying a starting knowledge base entity based on matching the starting knowledge base entity with the first entity from the natural language question.

3. The method of claim 2, wherein the plurality of primitives includes primitives of the knowledge base which are within a predefined number of hops from the starting knowledge base entity.

4. The method of claim 1, wherein the plurality of primitives includes:
   column names of tables in the database; and
   a cell value of the database identified by matching the cell value with the first entity from the natural language question.

5. The method of claim 1, further comprising:
   providing, by the enumerator to the ranker module, the plurality of primitives respectively concatenated with the natural language question and a special token identifying a class of primitive.

6. The method of claim 1, wherein the ranker module is trained to minimize a contrastive loss, wherein the contrastive loss is based on a positive primitive sample extracted from a ground-truth logical form, and a negative primitive sample.

7. The method of claim 6, wherein the negative primitive sample is selected from the primitives connected in the knowledge base to a first hop entity extracted from the ground-truth logical form.

8. The method of claim 6, wherein the negative primitive sample is selected by selecting a cell value in the same table and column as a cell value extracted from the ground-truth logical form.

9. A system for generating for a natural language question a logical form, the system comprising:
   a memory that stores a database or a knowledge base and a plurality of processor-executable instructions;
   a communication interface that receives the natural language question; and
   one or more hardware processors that read and execute the plurality of processor-executable instructions from the memory to perform operations comprising:
   identifying, via a named entity recognition procedure, a first entity from the natural language question;
   enumerating, by an enumerator based on the first entity, a plurality of primitives indicative of entities or entity relations in a database or a knowledge base;
   ranking, by a ranker module, the plurality of primitives based on their respective relevance to the natural language question;
   selecting a subset of top-ranked primitives based on the ranking;
   generating, by a neural network based generator, the logical form based on the natural language question and the subset of the plurality of primitives, wherein the logical form is executable on the database or the knowledge base and includes one or more of the plurality of primitives and one or more operations upon the one or more of the plurality of primitives;
   transmitting, via the communication interface, the logical form to a database system or a knowledge base system; and
   receiving, via the communication interface, a query result in response to the natural language question based on the logical form.

10. The system of claim 9, the operations further comprising:
    identifying a starting knowledge base entity based on matching the starting knowledge base entity with the first entity from the natural language question.

11. The system of claim 10, wherein the plurality of primitives includes primitives of the knowledge base which are within a predefined number of hops from the starting knowledge base entity.

12. The system of claim 9, wherein the plurality of primitives includes:
   column names of tables in the database; and
   a cell value of the database identified by matching the cell value with the first entity from the natural language question.

13. The system of claim 9, the operations further comprising:
   providing, by the enumerator to the ranker module, the plurality of primitives respectively concatenated with the natural language question and a special token identifying a class of primitive.

14. The system of claim 9, wherein the ranker module is trained to minimize a contrastive loss, wherein the contrastive loss is based on a positive primitive sample extracted from a ground-truth logical form, and a negative primitive sample.

15. The system of claim 14, wherein the negative primitive sample is selected from the primitives connected in the knowledge base to a first hop entity extracted from the ground-truth logical form.

16. The system of claim 14, wherein the negative primitive sample is selected by selecting a cell value in the same table and column as a cell value extracted from the ground-truth logical form.

17. A non-transitory machine-readable medium comprising a plurality of machine-executable instructions which, when executed by one or more processors, are adapted to cause the one or more processors to perform operations comprising:
   receiving, via a communication interface, a natural language question;
   identifying, via a named entity recognition procedure, a first entity from the natural language question;
   enumerating, by an enumerator based on the first entity, a plurality of primitives indicative of entities or entity relations in a database or a knowledge base;
   ranking, by a ranker module, the plurality of primitives based on their respective relevance to the natural language question;
   selecting a subset of top-ranked primitives based on the ranking;
   generating, by a neural network based generator, a logical form based on the natural language question and the subset of the plurality of primitives, wherein the logical form is executable on the database or the knowledge base and includes one or more of the plurality of primitives and one or more operations upon the one or more of the plurality of primitives;
   transmitting, via the communication interface, the logical form to a database system or a knowledge base system; and
   receiving, via the communication interface, a query result in response to the natural language question based on the logical form.

18. The non-transitory machine-readable medium of claim 17, the operations further comprising:
   identifying a starting knowledge base entity based on matching the starting knowledge base entity with the first entity from the natural language question.

19. The non-transitory machine-readable medium of claim 18, wherein the plurality of primitives includes primitives of the knowledge base which are within a predefined number of hops from the starting knowledge base entity.

20. The non-transitory machine-readable medium of claim 17, wherein the plurality of primitives includes:
   column names of tables in the database; and
   a cell value of the database identified by matching the cell value with the first entity from the natural language question.

* * * * *